(12) United States Patent
Renken

(10) Patent No.: US 7,666,477 B2
(45) Date of Patent: *Feb. 23, 2010

(54) PROCESS FOR COATING VEHICLE EXTERIOR PARTS COMPRISING POLYAMIDE RESINS AND PARTS AND ARTICLES COATED THEREBY

(75) Inventor: Andreas Renken, Geneva (CH)

(73) Assignee: E.I. du Pont de Nemours and Company, Wilmington, DE (US)

( * ) Notice: Subject to any disclaimer, the term of this patent is extended or adjusted under 35 U.S.C. 154(b) by 654 days.

This patent is subject to a terminal disclaimer.

(21) Appl. No.: 11/088,405

(22) Filed: Mar. 24, 2005

(65) Prior Publication Data

US 2005/0238814 A1 Oct. 27, 2005

Related U.S. Application Data

(60) Provisional application No. 60/557,811, filed on Mar. 30, 2004.

(51) Int. Cl.
*B05D 7/02* (2006.01)
*B05D 7/16* (2006.01)

(52) U.S. Cl. ............... 427/407.1; 427/409; 427/412.1; 427/384; 427/388.1; 427/393.5

(58) Field of Classification Search ............. 427/407.1, 427/409, 412.1, 384, 388.1, 393.5
See application file for complete search history.

(56) References Cited

U.S. PATENT DOCUMENTS

| 4,174,358 A | | 11/1979 | Epstein | |
| 5,639,819 A | * | 6/1997 | Farkas et al. | 524/606 |
| 6,187,376 B1 | * | 2/2001 | Campbell et al. | 427/142 |
| 2003/0073773 A1 | * | 4/2003 | Vathauer et al. | 524/447 |
| 2004/0063857 A1 | * | 4/2004 | Vathauer et al. | 525/63 |

FOREIGN PATENT DOCUMENTS

WO  WO 2004/009706 A1 * 1/2004

* cited by examiner

*Primary Examiner*—William Phillip Fletcher, III

(57) ABSTRACT

The present invention relates to a process for coating substrates assembled from at least one polymeric part, with visible polymeric surfaces, comprising successive steps of applying and curing at least one coating on the visible surfaces of the substrate. The polymeric parts comprise a polyamide composition comprising polyamide, novolac resin, and toughener. The polyamide compositions may further comprise mineral fillers, nucleating agents, and other additives. Articles coated according to the process herein are also disclosed.

9 Claims, No Drawings

US 7,666,477 B2

PROCESS FOR COATING VEHICLE EXTERIOR PARTS COMPRISING POLYAMIDE RESINS AND PARTS AND ARTICLES COATED THEREBY

CROSS REFERENCE TO RELATED APPLICATIONS

This application claims the benefit of U.S. Provisional Application No. 60/557,811, filed Mar. 30, 2004.

FIELD OF THE INVENTION

The present invention relates to a process for coating vehicle exterior parts comprising polyamide compositions comprising polyamide, novolac resin, and toughener as well as the parts coated by the process.

BACKGROUND OF THE INVENTION

The bodies of automobiles and other vehicles, including trucks, motorcycles, recreational vehicles, farm equipment, etc. have traditionally been made from sheet metal. Metal parts can be manufactured to have smooth, glossy surfaces that are desirable for automobiles and other vehicles. The good temperature resistance of metal body parts allows them to be conveniently coated using an online coating process. In an online coating process, metal body parts are attached to the chassis of the vehicle and given a first coating that serves in part to provide corrosion-resistance treatment through electrodeposition of a primer, the so-called "E-coat." The exterior of the vehicle is then treated with additional coating layers that can include a primer surfacer coat, a base coat containing the desired colorants, and a clear coat. During these coating steps, the vehicle body can in some cases be exposed to oven temperatures in excess of 200° C. for as long as at least 30 minutes. In particular, the E-coat can require extended exposure to high temperatures while curing.

It would be desirable to make vehicle exterior parts from polymeric materials because of their light weight relative to metal and the ease with which they can be molded into parts with intricate and complicated shapes. However, the polymeric materials must be able to be molded into articles that, when coated, have very similar or identical color tone, gloss, and short- and long-wave values to coated metal parts on the vehicle. The molded polymeric articles must also have good impact resistance, rigidity, chemical resistance, and dimensional stability.

In an offline coating process, the polymeric parts are coated separately from the rest of the vehicle body and attached after the rest of the body is coated in an online process. This means that the polymeric parts do not need to be exposed to the high temperatures of the online coating process. Disadvantages of this process include that it increases expense and that exact color matching between polymeric and metal parts can be difficult to achieve.

In an inline coating process only metal exterior parts are subjected to the electrodeposition primer coating process and its possible high temperature drying step. Polymeric parts are then added to the body of the vehicle for subsequent coating steps. This, however, requires additional steps in and interruption of the coating process that can introduce dust and other impurities into the process.

Thus, it would be desirable to make polymeric exterior parts that could be attached to the vehicle body prior to the E-coat step and be coated together with any metal parts present using standard online coating processes. This requires the use of polymer compositions that can withstand the conditions used for the E-coat step and subsequent coating steps without heat distortion and deformation.

Such polymeric exterior parts would need to be made from polymer compositions possessing good rigidity at the temperatures used in online coating processes and good dimensional stability when exposed to moisture as well as low coefficients of linear expansion. U.S. patent application publication 2003/0073773 discloses impact-modified polyamide compositions suitable for online lacquering. PCT patent application publication WO 2004/009706 discloses compositions comprising polyamide, impact-resistance modifiers, and a phenol-formaldehyde resin or an oligomeric or polymeric compound that has at least two phenolic hydroxyl groups

SUMMARY OF THE INVENTION

There is disclosed and claimed herein a process for coating substrates assembled from at least one polymeric part, with visible polymeric surfaces, comprising the successive steps of applying and curing at least one coating on the visible surfaces of the substrate, wherein at least some of the polymeric parts making up the visible surfaces of the substrate comprise a polyamide composition comprising:
   a. about 40 to about 98 weight percent polyamide;
   b. about 1 to about 20 weight percent novolac resin;
   c. about 1 to about 30 weight percent toughener; and
   d. 0 to about 40 weight percent mineral filler, where the weight percentages are based on the total weight of the composition.

By "visible" polymeric surfaces is meant those surfaces which can be viewed from the exterior of a vehicle or part; that is, these surfaces are of aesthetic interest to the consumer and are not hidden from plain view.

There is also disclosed and claimed herein articles coated by the process instantly claimed. These may include any of a fender, hood, trunk door, lift-up tailgate, door, side panel, protective molding, spoiler, hub cap, body sill, door sill, door handle, radiator grille, tank flap, mirror housing, or bumper.

DETAILED DESCRIPTION OF THE INVENTION

The process of the present invention provides for the coating of substrates, including vehicle exterior parts made from a polyamide resin composition. The vehicle parts may be coated using an online process or an offline or inline process. Examples of vehicles include automobiles, trucks, vans, motorcycles, bicycles, all-terrain vehicles, aquatic vehicles including boats and ships, snowmobiles, lawnmowers, tractors and other farm equipment, aircraft, bulldozers and other construction equipment, and the like. Examples of exterior parts include fenders, hoods, trunk doors, lift-up tailgates, doors, side panels, protective moldings, spoilers, hub caps, body sills, door sills, door handles, radiator grilles, tank flaps, bumpers, mirror housings, and other exterior parts.

The polyamide resin composition used in the present invention comprises polyamide, novolac resin, toughener, and, optionally, other ingredients such as mineral fillers.

The polyamide is at least one thermoplastic polyamide. Suitable polyamides can be condensation products of dicarboxylic acids and diamines, and/or aminocarboxylic acids, and/or ring-opening polymerization products of cyclic lactams. Sutiable dicarboxylic acids include, adipic acid, azelaic acid, sebacic acid, dodecanedioic acid, isophthalic acid and terephthalic acid. Suitable diamines include tetramethylenediamine, hexamethylenediamine, octamethylenediamine, nonamethylenediamine, dodecamethylenediamine, 2-methylpentamethylenediamine, 2-methyloctamethylenediamine, trimethylhexamethylenediamine, bis(p-aminocyclohexyl)methane, m-xylylenediamine, and p-xylylenediamine. A suitable aminocarboxylic acid is 11-aminododecanoic acid. Suitable cyclic lactams are caprolactam and laurolactam. Preferred aliphatic polyamides include polyamide 6; polyamide 6,6; polyamide 4,6; polyamide 6,10; polyamide 6,12; polyamide 11; polyamide 12; semi-aromatic polyamides such as poly(m-xylylene adipamide) (polyamide MXD,6), poly(dodecamethylene terephthalamide) (polyamide 12,T), poly(decamethylene terephthalamide) (polyamide 10,T), poly(nonamethylene terephthalamide) (polyamide 9,T), the polyamide of hexamethylene-terephthalamide and hexamethylene adipamide (polyamide 6,T/6,6); the polyamide of hexamethyleneterephthalamide and 2-methylpentamethyleneterephthalamide (polyamide 6,T/D,T) and copolymers and mixtures of these polymers. A preferred polyamide is polyamide 6,6.

The polyamide will be present in about 40 to about 98 weight percent, or preferably in about 50 to about 90 weight percent, based on the total weight of the composition. The polyamide used will preferably have a melting point that is at least about 20° C. greater than the curing temperature of any coating layers applied to vehicle body parts made from the composition.

Novolac resins, also known as thermoplastic phenol-formaldehyde resins, can be prepared by reacting at least one aldehyde with at least one phenol or substituted phenol in the presence of an acid or other catalyst such that there is a molar excess of the phenol or substituted phenol. Suitable phenols and substituted phenols include phenol, o-cresol, m-cresol, p-cresol, thymol, p-butyl phenol, tert-butyl catechol, resorcinol, bisphenol A, isoeugenol, o-methoxy phenol, 4,4'-dihydroxyphenyl-2,2-propane, isoamyl salicylate, benzyl salicylate, methyl salicylate, 2,6-di-tert-butyl-p-cresol, and the like. Suitable aldehydes and aldehyde precursors include formaldehyde, paraformaldehyde, polyoxymethylene, trioxane, and the like. More than one aldehyde and/or phenol may be used in the preparation of the novolac. A blend of two more different novolacs may also be used. Any thermoplastic novolac that can be used for conventional plastic molding is suitable, although a number average molecular weight of between 500 and 1500 will provide minimal warpage and optimal mechanical properties.

The novolac resin will be present in about 1 to about 20 weight percent, or preferably about 5 to about 15 weight percent, based on the total weight of the composition.

The toughener is any toughener suitable for toughening polyamide resins. Examples of suitable tougheners are given in U.S. Pat. No. 4,174,358, which is hereby incorporated by reference herein. Preferred tougheners are carboxyl-substituted polyolefins, which are polyolefins that have carboxylic moieties attached thereto, either on the polyolefin backbone itself or on side chains. By 'carboxylic moiety' is meant carboxylic groups such as one or more of dicarboxylic acids, diesters, dicarboxylic monoesters, acid anhydrides, monocarboxylic acids and esters, and salts. Carboxylic salts are neutralized carboxylic acids. Useful tougheners are dicarboxyl-substituted polyolefins, which are polyolefins that have dicarboxylic moieties attached thereto, either on the polyolefin backbone itself or on side chains. By 'dicarboxylic moiety' is meant dicarboxylic groups such as one or more of dicarboxylic acids, diesters, dicarboxylic monoesters, and acid anhydrides.

The toughener will preferably be based on an ethylene/α-olefin polyolefin. Diene monomers such as 1,4-hexadiene or dicyclopentadiene may optionally be used in the preparation of the polyolefin. Preferred polyolefins are ethylene-propylene-diene (EPDM) polymers made from 1,4-hexadiene and/or dicyclopentadiene and ethylene/propylene copolymers. The carboxyl moiety may be introducing during the preparation of the polyolefin by copolymerizing with an unsaturated carboxyl-containing monomer. Preferred is a copolymer of ethylene and maleic anhydride monoethyl ester. The carboxyl moiety may also be introduced by grafting the polyolefin with an unsaturated compound containing a carboxyl moiety, such as an acid, ester, diacid, diester, acid ester, or anhydride. A preferred grafting agent is maleic anhydride. A preferred toughener is an EPDM polymer or ethylene/propylene copolymer grafted with maleic anhydride. Blends of polyolefins, such as polyethylene, polypropylene, and EPDM polymers with polyolefins that have been grafted with an unsaturated compound containing a carboxyl moiety may be used as tougheners. Other preferred tougheners are ionomers, which are carboxyl-group containing polymers that have been partially neutralized with bivalent metal cations such as zinc, manganese, magnesium, or the like. Preferred ionomers are ethylene/acrylic acid and ethylene/methacrylic acid copolymers that have been partially neutralized with zinc. Ionomers are commercially available under the Surlyn® trademark from E. I. DuPont de Nemours & Co., Inc., Wilmington, Del.

The toughener will be present in about 1 to about 30 weight percent, or preferably about 4 to about 30 weight percent based on the total weight of the composition.

The polyamide composition used in the present invention may optionally further comprise up to about 40 weight percent, based on the total weight of the composition, of a mineral filler such as wollastonite, talc, mica, calcined clay, and, glass beads. The mineral filler will preferably be selected such that vehicle body parts coated using the process of the present invention have very similar or identical color tone, gloss, and short- and long-wave values to coated metal parts on the vehicle. When coated metal parts are not present on the vehicle, the mineral filler will preferably be selected such that the vehicle body parts have a surface appearance that meets applicable standards and requirements. When used, the mineral filler will preferably be present in about 5 to about 40 weight percent, or more preferably about 5 to about 30 weight percent, based on the total weight of the composition.

The polyamide composition used in the present invention may optionally further comprise up to 5 weight percent of a nucleating agent. An example of a suitable nucleating agent is finely-ground talc. When used, the nucleating agent will preferably be present in about 0.05 to about 5 weight percent, or more preferably about 0.05 to about 1 weight percent, based on the total weight of the polyamide composition.

The polyamide composition used in the present invention may optionally further comprise additives such as thermal stabilizers including antioxidants, light stabilizers, lubricants, mold-release agents, plasticizers, dyes, pigments, and the like. When used, the additives will preferably be present in about 0.05 to about 5 weight percent, based on the total weight of the composition.

The polyamide compositions used in the present invention are melt-blended and can be manufactured by any known manufacturing methods. The component materials may be well mixed using a melt-mixer such as a single or twin-screw extruder, blender, kneader, Banbury mixer, etc. to give a resin composition. Or, part of the materials may be mixed in a melt-mixer, and the rest of the materials may then be added and further melt-mixed.

The polyamide compositions may be formed into substrates, including vehicle exterior parts, to be coated by using any suitable melt-processing technique. Commonly used melt-molding methods known in the art such as injection molding, extrusion, blow molding, injection blow molding, and thermoforming are preferred.

The vehicle exterior parts comprising the polyamide compositions have a combination of good toughness, good dimensional stability, high surface gloss, good coating adhesion, low coefficient of linear thermal expansion, and good resistance to deformation when exposed to elevated temperatures, such as those that are typically used to cure electrodeposited corrosion resistance coatings (E-coats).

The vehicle exterior parts may optionally be coated with a conductive primer that provides the parts with sufficient electrical conductivity for electrostatically-assisted coating processes, as will be understood by one skilled in the art. The parts may be attached to the frame of the vehicle, optionally in the presence of other exterior parts made from any appropriate materials, including metals such as galvanized and ungalvanized steel, aluminum and aluminum alloys, and magnesium and magnesium alloys. In one embodiment of the invention that may be part of an offline or inline coating process, at least one part comprising the polyamide compositions used in the present invention, optionally attached to a vehicle frame, is treated with at least one coating layer, preferably applied by a spraying process, and more preferably-applied by an electrostatically-assisted spraying process to at least the visible surfaces of the exterior parts. Examples of conventional multicoat constructions formed from a plurality of coating layers include primer surfacer/top coat; primer surfacer/base coat/clear coat; base coat/clear coat; and primer surfacer substitute layer/base coat/clear coat.

Primer surfacer or primer surfacer substitute coatings are designed to smooth the surface of the parts and remove imperfections and provide stone-chip protection. They also prepare the surface for subsequent decorative and protective top coatings. The base coat typically contains colorants such as pigments and provides protection against the elements. The multicoat constructions may be further coated over part or all of the surface with a transparent sealing coat that may provide high scratch resistance.

The coating layers may be applied using conventional coating agents known to those skilled in the art. The coating agents may be powder coating agents or liquid coating agents containing, e.g., water and/or organic solvents as diluents. The coating agents may be single- or multi-component coating agents. They may be dried physically or by oxidation or by using chemical cross-linking agents. Primer surfacers top coats, clear coats, and sealing coats are preferably chemically cross-linked using systems that can be cured thermally (e.g. by convection and/or infrared radiation) and/or by radiation, such as ultraviolet radiation.

If more than one coating layer is applied, each coating layers does not have to be cured separately prior to the application of the subsequent layer. As will be understood by one skilled in the art, coating layers may be applied to wet layers and two or more layers may be cured together. For example, in the case of a base coat and a clear coat, following the application of the base coat, and optionally a short flash-off phase, the clear coat may be applied and cured together with the base coat.

In another embodiment of the process of the present invention that may be part of an online coating process, prior to the application of one or more additional coating layers as described above, at least one vehicle exterior part comprising the polyamide compositions used in the present invention and at least one metal vehicle exterior part, where the parts are optionally attached to a vehicle frame, is treated with a corrosion-resistance electrodeposition primer coating (referred to as an "E-coat") in a conventional electrodeposition process that is known to one skilled in the art. Suitable coating agents include waterborne compositions with a solids content of about 10 to about 30 weight percent.

Suitable coating agents may be anodic electrodeposition compositions known to those skilled in the art. The binders used in anodic coating compositions can include, but are not limited to polyesters, epoxy resin esters, (meth)acrylic copolymer resins, maleinate oils or polybutadiene oils with a weight average molecular weight of about 300 to about 10,000 and a carboxyl group content corresponding to an acid value of about 35 to about 300 mg KOH/g. At least a portion of the carboxyl groups are preferably converted carboxylate groups by neutralization with base. The binders may be self-cross-linking or may be cross-linked with separate cross-linking agents.

Suitable coating agents may also be cathodic electrodeposition compositions. Preferred cathodic electrodeposition compositions contain binders with cationic groups or groups that can be converted to cationic groups, such as basic groups. Examples of suitable groups can include amino; ammonium, such as quaternary ammonium; phosphonium; and/or sulfonium groups. Nitrogen-containing basic groups are preferred and may be present in a quaternized form or converted to cationic groups with a conventional neutralizing agent such as an organic monocarboxylic acid such as formic acid, lactic acid, methane sulfonic acid or acetic acid. Preferred are basic resins with primary, secondary, and/or tertiary amino groups corresponding to an amine value of about 20 to about 200 mg KOH/g. The weight average molecular weight of the binders is preferably about 300 to about 10,000. Examples of suitable binders include amino(meth)acrylic resins, aminoepoxy resins, aminoepoxy resins with terminal double bonds, aminoepoxy resins with primary hydroxyl groups, aminopolyurethane resins, amino group containing polybutadiene resins, or modified epoxy resin/carbon dioxide-amine reaction products. The binders may be self-cross-linking or may be cross-linked with separate cross-linking agents present in the mixture. Examples of suitable cross-linking agents include aminoplastic resins, blocked polyisocyanates, cross-linking agents with terminal double bonds, polyepoxy compounds, or cross-linking agents containing groups capable of transesterification.

The electrodeposition coating compositions may further contain pigments, fillers, and/or conventional coating additives. Examples of suitable pigments include conventional inorganic and/or organic colored pigments and/or fillers such as carbon black, titanium dioxide, iron oxide pigments, phthalocyanine pigments, quinacridone pigments, kaolin, talc or silicon dioxide. Examples of additives include wetting agents, neutralizing agents, leveling agents, catalysts, corrosion inhibitors, anti-cratering agents, anti-foaming agents, and solvents.

An electrodeposition coating process known to those skilled in the art may be used. Deposition voltages may be about 200 to about 500 V. After deposition of the coating, the substrate may be cleaned of any excess or adhering but non-deposited coating in a manner known to those skilled in the art, by, for example, rinsing with water. The coated vehicle exterior parts are then baked at oven temperatures of up to about 200 to about 220° C. in order to cross-link the electrodeposition coating.

EXAMPLES

The compositions used in Examples 1-3 and Comparative Examples 1 and 2 were prepared by compounding the ingredients shown in Table 1 using an eight barrel Berstorff 40 mm twin-screw extruder. A ingredients were fed to the rear of the extruder. Barrel temperatures were set at about 280° C., resulting in a melt temperature of about 285-290° C. Upon exiting the extruder, the molten polymer was quenched in a water bath and pelletized. The resulting compositions were used to mold test pieces for testing.

The components used in Table 1 were as follows:
Polyamide 66: A polyamide 6,6 having a relative viscosity of 49 as measured in formic acid.
Novolac resin: HRJ 12700 CF, supplied by Schenectady International, Inc.
Toughener A: An ethylene-octene copolymer.
Toughener B: Ethylene-propylene copolymer grafted with 0.9 weight percent maleic anhydride.
Crodamide 212: Stearyl erucamide, supplied by Croda Universal, Ltd., East Yorkshire, U.K.
Steamic OOS: Talc supplied by Luzenac Naintsch, Ganz, Austria.

Mechanical Properties

Tensile properties of the compositions were measured according to ISO 157-1/2. Notched Charpy impact strengths were determined according to ISO 179/1eA. Unnotched Charpy impact strengths were determined according to ISO 179/1eU. The results are given in Table 1.

Painting Process

Test pieces having dimensions 130×130×3 mm were coated with a waterborne 2K conductive primer (Product number 01-77037/129495 3941020/180A from Akzo Nobel) and dried for 30 minutes at 80° C. The test pieces were baked for 30 minutes at 190° C. to simulate typical e-coat baking temperatures. Subsequently, a waterborne primer surfacer (Titanium Silver VL-207-7073 from Akzo Nobel) was applied and the test pieces were dried at 80° C. for 10 minutes and then at 160° C. for 20 minutes. The test piece was cooled to room temperature and a waterborne base coat (Titanium Silver FW 61-911 M-0950 from BASF) was applied on the primer surfacer layer. The base coat was dried at 80° C. for 10 minutes and then cooled to room temperature. Then a solvent borne 2K clear coat (2K Clear 40496.0 from DuPont Performance Coatings, GmbH Co. KG, Wuppertal, Germany) was applied and dried at 145° C. for 20 minutes. All coating layers were manually applied pneumatically.

Paint Adhesion Testing

Paint adhesion on the test pieces painted as described above was determined using a cross-cut test according to ISO 2409. The results are given in Table 1. A result of "0" indicates that no paint came off the surface during the test and that paint adhesion was satisfactory.

Heat Sag Testing

Heat sag resistance is a test that evaluates the suitability of a composition for use in an E-coating step and measures the ability of a material to withstand a typical E-coat drying temperature of 200° C. for 30 min. The compositions are molded into test pieces having dimensions of 169×26×2 mm. The test pieces are placed in a metal fixture that supports all but 97 mm of the bar such that the 97 mm portion is left hanging unsupported. The distance from the unsupported end of the bar to the bottom of the fixture is measured. The fixture is placed in an oven at 200° C. for 30 minutes, after which time it is removed from the oven and allowed to cool to room temperature over about 30-45 minutes. Once room temperature is reached, the distance from the unsupported end of the bar to the bottom of the fixture is measured again and the result is subtracted from initial distance before heating. The result is defined as the "heat sag". The results are given in Table 1. A heat sag of about 15 mm or less is suitable for many applications.

Painted Surface Aspect

Painted surface aspect was determined using wave scan DOI (distinctness of image) measurements. Three laser beams arranged in parallel are directed at an angle of 60° towards the surface of a plaque molded from the compositions and the reflected light is detected by a measuring head that moves up to 20 cm across the surface, taking a data point every 0.027 mm. A DOI (distinctness of image) value and long wave and short wave values are calculated. The results indicate the quality of the surface appearance. Values for DOI range from 0 to 100, where 100 is the best and a value of at least 85 is deemed to be acceptable. The results are given in Table 1.

Moisture Absorption

Moisture absorption was measured on 130×130×3 mm test pieces at 70° C. and 62% relative humidity, as described in ISO 1110. The results are given in Table 1 as percent moisture absorption, based on the initial weight of the test piece.

A comparison of Example 1 with Comparative Example 1 shows that the presence of novolac resin leads to a substrate having a decreased moisture absorption. A comparison of Example 2 with Comparative Example 2 shows that the presence of toughener leads to a substrate having improved impact strength.

TABLE 1

|  | Example 1 | Example 2 | Example 3 | Comp. Ex. 1 | Comp. Ex. 2 |
| --- | --- | --- | --- | --- | --- |
| Polyamide 6,6 | 84.75 | 72.9 | 84.65 | 89.9 | 87.9 |
| Novolac resin | 5.25 | 11 | 5.25 | — | 11 |
| Toughener A | 5.4 | 9.8 | 5.4 | 5.4 | — |
| Toughener B | 3.6 | 5.2 | 3.6 | 3.6 | — |
| Aluminum stearate | 0.1 | 0.1 | 0.1 | 0.1 | 0.1 |
| Crodamide 212 | 0.9 | 0.9 | 0.9 | 0.9 | 0.9 |
| Steamic OOS | — | — | 0.1 | — | 0.1 |
| Tensile modulus (GPa) | 2.8 | 2.5 | 2.9 | 2.7 | 3.1 |
| Notched Charpy impact | 12 | 19 | 11 | 12 | 3 |

TABLE 1-continued

|  | Example 1 | Example 2 | Example 3 | Comp. Ex. 1 | Comp. Ex. 2 |
|---|---|---|---|---|---|
| strength (kJ/m$^2$) | | | | | |
| Unnotched Charpy impact strength (kJ/m$^2$) | no break | no break | no break | no break | 69 |
| Paint adhesion/cross-cut test | 0 | 0 | 0 | 0 | 0 |
| Moisture absorption (%) | 2.2 | 1.8 | 2.1 | 2.7 | 1.8 |
| Heat sag (mm) | 5.3 | 8.5 | 5.3 | 4.5 | — |
| Painted surface aspect | | | | | |
| DOI | 95.5 | — | — | — | — |
| Short wave | 7.5 | — | — | — | — |
| Long wave | 8.3 | — | — | — | — |

All ingredient quantities are given in weight percent relative to the total weight of the composition.

What is claimed is:

1. A process for coating substrates assembled from metal parts and at least one polymeric part, with visible metal and plastic surfaces, comprising the successive steps of (1) electrodeposition coating the substrates, removing non-deposited electrodeposition coating agent from the substrate and thermally cross-linking the deposited electrodeposition coating by baking at an oven temperature of up to about 200 to about 220° C., and thereby forming an electrodeposition coating primer on the metal surfaces, and (2) applying and curing at least one coating on the visible surfaces of the substrate, wherein at least some of the polymeric parts making up the visible surfaces of the substrate comprise a polyamide composition comprising:
   a. about 40 to about 98 weight percent polyamide;
   b. about 1 to about 20 weight percent novolac resin;
   c. about 1 to about 30 weight percent toughener; and
   d. 0 to about 40 weight percent mineral filler, where the weight percentages are based on the total weight of the composition.

2. The process of claim 1 wherein the polyamide composition further comprises a nucleating agent.

3. The process of claim 1 wherein the toughener comprises an EPDM polyolefin grafted with maleic anhydride or an ethylene/propylene copolymer grafted with maleic anhydride.

4. The process of claim 1 wherein the polyamide is polyamide 6,6.

5. The process of claim 1 wherein the at least one coating of (2) comprises a primer surfacer and top coat; a primer surfacer, base coat and clear coat; a base coat and clear coat; and a primer surfacer substitute layer, base coat and clear coat.

6. The process of claim 1, wherein said baking is performed for at least 30 minutes.

7. The process of claim 6, wherein the polyamide composition comprises 0% mineral filler.

8. process of claim 1, wherein the polymeric part comprising the polyamide composition has a heat sag of about 15 mm or less.

9. The process of claim 8, wherein the polyamide composition comprises 0% mineral filler.

* * * * *